Oct. 22, 1929. H. M. LAMBERT 1,733,064
TIRE MOLD
Filed May 4, 1927 3 Sheets-Sheet 2
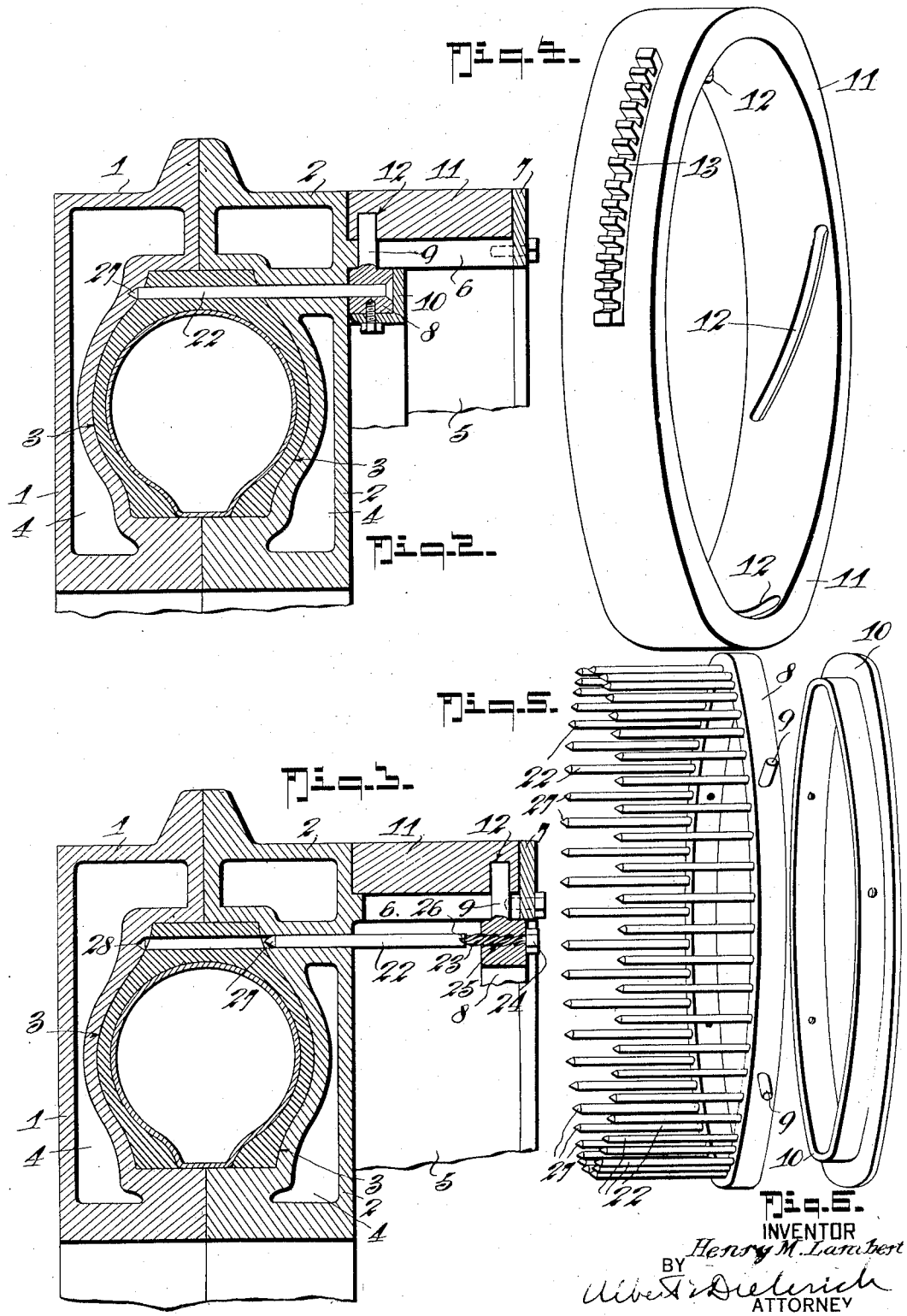
INVENTOR
Henry M. Lambert
BY
ATTORNEY

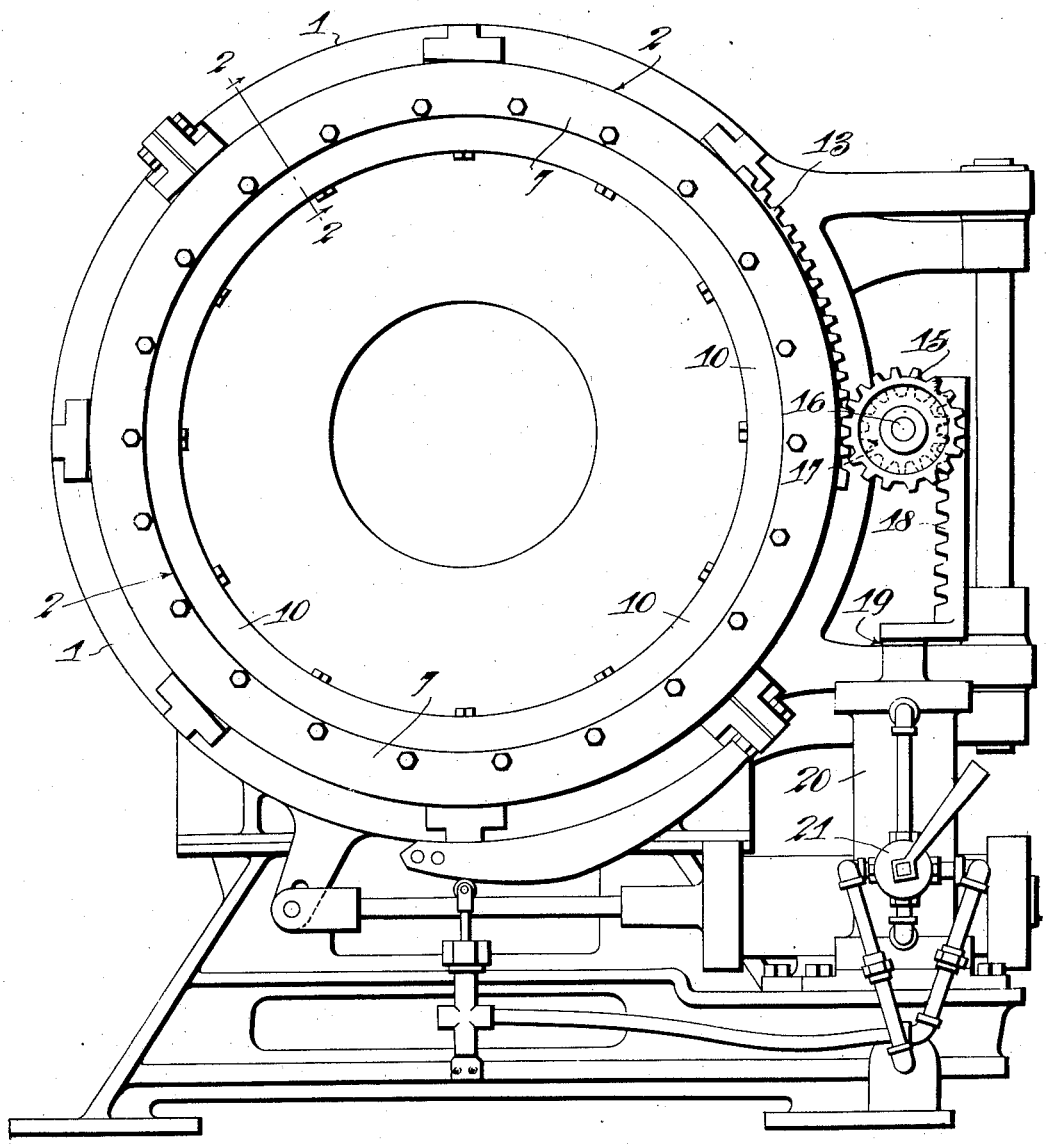

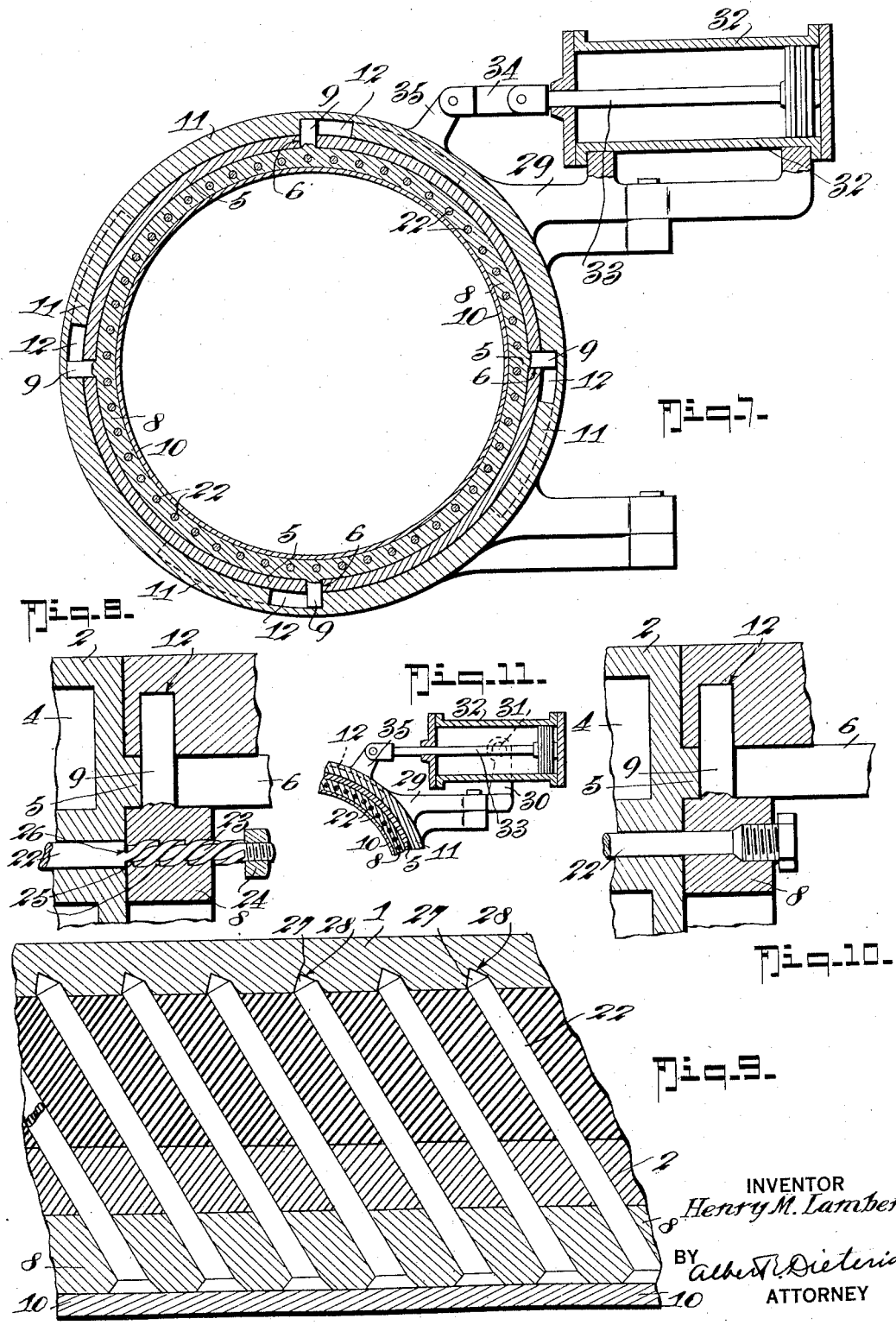

Patented Oct. 22, 1929

1,733,064

UNITED STATES PATENT OFFICE

HENRY M. LAMBERT, OF PORTLAND, OREGON; HELEN H. LAMBERT EXECUTRIX OF SAID HENRY M. LAMBERT, DECEASED, ASSIGNOR TO THE LAMBERT TIRE AND RUBBER COMPANY, OF BARBERTON, OHIO, A CORPORATION OF OHIO

TIRE MOLD

Application filed May 4, 1927. Serial No. 188,727.

My invention relates to certain new and useful improvements in molds for tires and the present invention particularly seeks to provide a mold that is especially adapted for use in the manufacture of pneumatic tires having thick rubber treads with apertures in the tread, although the invention is also adaptable to other molds, as for instance those used in the manufacture of vented cushion tires. In the manufacture of tires having holes through the rubber body, core pins are employed to give form to the holes and restrain the rubber against filling the holes during vulcanization. Heretofore it has been a practice to form the vented tread of pneumatic tires by pressing the tread rubber radially outward, or inward, or both around the pins previously positioned within the molding cavity. This method is somewhat costly and has certain other disadvantages not necessary to mention here. My invention, therefore, has for its object to provide a means which will eliminate the disadvantages of the method just stated, and provide means whereby the carcass with tread rubber applied may be placed in the mold and after the mold is closed, the core pins may be forced through the tread rubber to form the apertures in the tread, and after vulcanization, be withdrawn readily.

Another object of the invention is to provide a mold of the so-called watch-case type with a mechanism for carrying, inserting and withdrawing the core pins, and as an associated part of the mold itself, so that all operations of placing the carcass in the mold, pressing the core pins into the rubber, vulcanizing the tire, withdrawing the core pins, and finally removing the vulcanized tire from the mold, may be accomplished at one and the same station or place in the factory.

Yet another object is to provide suitable power means to effect the action of the pin inserting and withdrawing mechanism.

Generically the invention lies in the provision of the vulcanizing mold with a pin carrying ring movable along an axis parallel to the axes of the pins, and means associated with the pin carrying ring for forcing the pins into the rubber within the molding cavity and withdrawing the pins therefrom after vulcanization has taken place, or sooner if desired.

In the drawings:

Figure 1 is a side elevation (largely diagrammatic) of a mold with my invention applied.

Figure 2 is a detail horizontal section of the same on the line 2—2 of Figure 1, the pins being located within the molding chamber.

Figure 3 is a detail horizontal section on the line 2—2 of Figure 1 with the pins withdrawn and showing a modification of the invention.

Figure 4 is a detail perspective view of the shifting ring.

Figure 5 is a detail perspective view of the pin carrying ring.

Figure 6 is a detail perspective view of the pin retaining ring.

Figure 7 is a detail view, largely diagrammatic, showing another mechanism for shifting the shiftable ring.

Figure 8 is an enlarged detail section showing the means for twisting or rotating the pins.

Figure 9 is a diagrammatic view showing the adaptation of the invention for making the holes diagonal instead of straight through the tire.

Figure 10 is a detail view of a modified way of retaining the pins in the pin ring.

Figure 11 is a detail view of a modification.

Referring now to the accompanying drawings, in which like numerals of reference indicate like parts in all the figures, 1 represents the mold which, in this illustration, is of the watch-case type and is provided with the usual molding chamber 3 and steam chamber 4. The door of the mold 1 is cast with an annular flange 5 that serves as a core pin ring guiding and pin moving ring supporting annulus.

The flange or annulus 5 has slots 6 which lie parallel to the axes of the pins and the slots are adapted to receive the lugs 9 of the pin carrying ring 8.

The flange 5 carries a retaining plate 7, the purpose for which will presently appear.

The pins 22 are preferably headed and held in recessed apertures in the pin carrying ring 8 which is provided with a pin retaining ring 10 as shown.

Mounted on the annular flange 5 is a pin moving or shifting ring 11 which has inclined slots 12 to receive the pin carrying ring lugs 9.

In order to impart a rotational movement to the pin shifting ring 11 any suitable mechanism may be provided preferably such as is power operated and as an example of such mechanism the ring 11 may be provided with a gear 13 operated by a pinion 15 on a shaft 16 that has a pinion 17 which meshes with an operating rack 18 on the piston rod 19. 20 is the hydraulic cylinder which operates the piston rod 19 and is controlled by suitable controlling valves 21. The hydraulic cylinder and its piston and its controlling means, etc. may be such as is now used on certain types of watch-case molds for opening and closing the door.

In using my invention the tire is built up and placed in the mold after which the mold is closed. Of course a suitable core for the carcass is employed which may be an air bag or any other suitable core usually used in the manufacture of pneumatic tires, and after the mold is closed but before vulcanization has been completed, the hydraulic mechanism is caused to turn the pin shifting ring 11 in a direction to force the pins into the molding chamber and through the tread rubber of the tire thereby producing the holes desired. After vulcanization the hydraulic operating mechanism is reversed, the ring 11 turned in the opposite direction and the pins withdrawn. Thus when the mold is open for the purpose of removing the tire the tire can readily be stripped from the mold wall since the pins have been withdrawn and no longer offer resistance to such removal.

In order to loosen the pins from the rubber after vulcanization, the first portion of the recessional movement of the pin ring may be utilized to impart a twist to the pin. This is accomplished by providing the shanks of the pins with spiral grooves or threadways 23, and the pin ring 8 with keys 25 to ride in the grooves 23, nuts 24 being provided to hold the pins against withdrawal from the pin ring and shoulders 26 provide abutments against which the ring 8 presses in forcing the pins into the rubber.

The free ends 27 of the pins are preferably pointed or tapered and when in their molding position they enter similarly formed recesses 28 in the opposite mold wall, thus not only insuring proper centering of the pins but also preventing clogging of the recesses by flowing rubber.

Instead of employing the mechanism shown in Figure 1 for rotating the pin shifting ring 11, the mechanism illustrated in Figure 7 may be employed. In this embodiment of the invention a suitable bracket 29 is provided to sustain rigidly the power cylinder 32, the piston rod 33 of which is connected to an arm 35 on the ring by a link 34; or the arrangement shown in Figure 11 may be employed in which the bracket 29 is provided with bearings 30 for the trunnions 31 on the sides of the power cylinder 32, the piston rod 37 of which is directly connected to the arm 35. In either of the embodiments shown in Figures 7 or 11, the operation of the piston is controlled in the same manner as in the embodiment shown in Figure 1.

In operating the mold with the pin-twisting instrumentalities, it will be noted that when the pins are to be forced into the rubber, shoulders 26 provide a rigid abutment against which the pin ring 8 acts. When the reverse movement of the pin ring clears, the initial part of that movement will result in imparting a twisting to the pins until the ring 8 comes in contact with the nuts 24 when the continued movement of the ring will effect the full withdrawal of the pins from the finished tire.

From the foregoing description, taken in connection with the accompanying drawing, it is thought the complete construction, operation and advantages of my invention will be clear to those skilled in the art to which it relates, and while I have illustrated the invention as applied to a pneumatic tire mold it is quite obvious that with slight modifications the invention may also be adapted to molds for making cushion tires of the ventilated type.

What I claim is:

1. In a tire mold of the sectional type having a molding cavity, one of said mold sections having apertures to permit passage of core pins, core pins mounted on said apertured mold section and adapted to be advanced into and withdrawn from the molding cavity and mechanism for moving the pins into and withdrawing them from the molding cavity, said mechanism comprising a pin carrying ring, means to mount said ring for movement along the direction of the axis of the mold, means operating on said ring to impart such movement thereto, said last named means comprising a rotatable body and pin and cam slot connections between said body and said ring and means by which said body may be rotated.

2. In a two-part tire mold having a molding chamber, an annular flange mounted on one side of said mold, said flange having slots lying parallel to the axis of the mold, said side of the mold having pin holes, core pins lying in said holes, a pin ring to which said pins are connected, said pin ring having lugs lying in said slots whereby the pin ring may be moved axially and retained against rotation, and means operating on said lugs to move the pin ring for the purposes specified.

3. In a two-part tire mold having a molding chamber, an annular flange mounted on one side of said mold, said flange having slots lying parallel to the axis of the mold, said side of the mold having pin holes, core pins lying in said holes, a pin ring to which said pins are connected, said pin ring having lugs lying in said slots whereby the pin ring may be moved axially and retained against rotation, a shifting ring mounted on said flange and having inclined slots to receive said lugs, and means to rotate said shifting ring for the purposes specified.

4. In a two-part tire mold having a molding chamber, an annular flange mounted on one side of the said mold, said flange having slots lying parallel to the axis of the mold, said side of the mold having pin holes, core pins lying in said holes, a pin ring to which said pins are connected, said pin ring having lugs lying in said slots whereby the pin ring may be moved axially and retained against rotation, a shifting ring mounted on said flange and having inclined slots to receive said lugs, and power operated mechanism for turning said shifting ring in either direction for the purpose specified.

5. In a tire mold of the watch-case type in which is provided a molding chamber, and a door, an annular flange on the door, said flange having slots lying parallel to the axis of the mold, said door having pin holes, core pins lying in said holes and adapted to be advanced into and retracted from the molding cavity, a pin ring to which said pins are connected, said pin ring having lugs lying in said slots whereby the pin ring may be moved axially and retained against rotation, a shifting ring rotatably mounted on said flange and having cam slots to receive said lugs, a ring gear on said shifting ring, and a cylinder and piston with gear connections to said ring gear, means for controlling the operation of said cylinder and piston to turn said shifting ring in one direction or the other to cause an advance or retraction of said core pins for the purposes specified.

6. The combination with a tire mold having a molding cavity, of a carrying ring, core pins carried by said ring, said mold having apertures for the passage of said pins into and from the molding cavity, and mechanism for advancing the pins into and withdrawing the same from the molding cavity, said advancing mechanism including means for imparting a twist to the pins.

7. In a tire mold of the sectional type having a molding cavity, one of said mold sections having apertures to permit passage of core pins, core pins mounted on said apertured mold section and adapted to be advanced into and withdrawn from the molding cavity and mechanism for moving the pins into and withdrawing them from the molding cavity, and means operable during the withdrawing movement of said mechanism for imparting a twist to the pins.

8. In a tire mold of the sectional type having a molding cavity, one of said mold sections having apertures to permit passage of core pins, core pins mounted on said apertured mold section and adapted to be advanced into and withdrawn from the molding cavity and mechanism for moving the pins into and withdrawing them from the molding cavity, said mechanism comprising a pin carrying ring, means to mount said ring for movement along the direction of the axis of the mold, and means operating on said ring to impart such movement thereto, said pin carrying ring and said pins having cooperating means for imparting a twist to the pins.

9. In a tire mold of the sectional type having a molding cavity, one of said mold sections having apertures to permit passage of core pins, core pins mounted on said apertured mold section and adapted to be advanced into and withdrawn from the molding cavity and mechanism for moving the pins into and withdrawing them from the molding cavity, said mechanism comprising a pin ring, said pins having a limited movement in the direction of their axes with respect to said core pin carrying ring and means within the limits of said limited movement for imparting a twist to the pins.

HENRY M. LAMBERT.